US011427037B2

(12) United States Patent
Kuwano et al.

(10) Patent No.: US 11,427,037 B2
(45) Date of Patent: *Aug. 30, 2022

(54) PNEUMATIC TIRE WITH RIM PROTECTOR INCLUDING PLURALITY OF RECESSES

(71) Applicant: Toyo Tire Corporation, Itami (JP)

(72) Inventors: Shingo Kuwano, Itami (JP); Toshikazu Yasunaga, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 22 days.

This patent is subject to a terminal disclaimer.

(21) Appl. No.: 16/704,474

(22) Filed: Dec. 5, 2019

(65) Prior Publication Data

US 2020/0180360 A1 Jun. 11, 2020

(30) Foreign Application Priority Data

Dec. 11, 2018 (JP) .............................. JP2018-231376

(51) Int. Cl.
*B60C 13/02* (2006.01)
*B60C 15/024* (2006.01)

(52) U.S. Cl.
CPC .......... *B60C 15/0242* (2013.01); *B60C 13/02* (2013.01)

(58) Field of Classification Search
CPC ... B60C 13/002; B60C 13/02; B60C 15/0242; B60C 15/024; B60C 15/023; B60C 15/02
USPC ................................................ 152/544, 523
See application file for complete search history.

(56) References Cited

U.S. PATENT DOCUMENTS

| 6,418,993 | B1 * | 7/2002 | Sakamoto | ............. | B60C 15/024 |
| | | | | | 152/523 |
| 6,913,051 | B2 * | 7/2005 | Auxerre | ................. | B60C 15/024 |
| 2004/0003881 | A1 * | 1/2004 | Ebiko | ................... | B60C 13/001 |
| | | | | | 152/523 |
| 2009/0032161 | A1 | 2/2009 | Yamaguchi | | |
| 2020/0180364 | A1 * | 6/2020 | Kuwano | ............. | B60C 15/0242 |

FOREIGN PATENT DOCUMENTS

| CN | 101166642 A |   | 4/2008 |
| JP | 06032121 A | * | 2/1994 |
| JP | 08197917 A | * | 8/1996 |

(Continued)

OTHER PUBLICATIONS

Yamaguchi, WO-2007032405-A1 Machine Translation (Year: 2007).*

(Continued)

*Primary Examiner* — Adrienne C. Johnstone
(74) *Attorney, Agent, or Firm* — WHDA, LLP

(57) ABSTRACT

A tire has a rim protector which is formed at a sidewall and which constitutes an annular protrusion that extends in a tire circumferential direction. The rim protector has not less than two recesses that extend toward the tread region from a location toward the bead region in such fashion as to be directed toward a location in a second direction from a location in a first direction in the tire circumferential direction, the not less than two recesses being arranged with spaces therebetween in the tire circumferential direction. A mutually adjacent pair of recesses among the not less than two recesses are in a positional relationship such that they partially overlap as seen when projected onto a virtual plane perpendicular to a tire radial direction.

5 Claims, 6 Drawing Sheets

(56) References Cited

FOREIGN PATENT DOCUMENTS

| | | | | |
|---|---|---|---|---|
| JP | 2001039129 A | * | 2/2001 | |
| JP | 2002-59712 A | | 2/2002 | |
| JP | 2003146026 A | * | 5/2003 | |
| JP | 2014201079 A | * | 10/2014 | |
| JP | 2015030420 A | * | 2/2015 | ............. B60C 13/02 |
| JP | 2015057336 A | * | 3/2015 | |
| WO | WO-2007032405 A1 | * | 3/2007 | ............. B60C 13/02 |
| WO | 2015/019975 A1 | | 2/2015 | |

OTHER PUBLICATIONS

Sugitani, JP-2003146026-A Machine Translation (Year: 2003).*
Umezawa, JP-06032121-A Machine Translation (Year: 1994).*
Okane, JP-2015030420-A Machine Translation (Year: 2015).*
Office Action dated Aug. 13, 2021, issued in counterpart CN application No. 201910924976.0, with English translation. (19 pages).
Gao, Mengxiong et al., "Underground mining truck", Beijing Metallurgical Industry Press, 2016, with Partial English Translation; Cited in CN Office Action dated Nov. 22, 2021. (12 pages).
Office Action dated Nov. 22, 2021, issued in counterpart CN Application No. 201910924976.0, with English Translation. (12 pages).

* cited by examiner

A1-A1

PNEUMATIC TIRE WITH RIM PROTECTOR INCLUDING PLURALITY OF RECESSES

BACKGROUND OF THE INVENTION

Field of the Invention

The present disclosure relates to a pneumatic tire.

Description of the Related Art

A pneumatic tire has a tread, and beads, and has sidewalls arranged between the tread and the beads. There are pneumatic tires in which a rim protector is formed along the entire circumference at a portion of the sidewall that is located toward the exterior in the tire radial direction from the region contacted by the rim flange. It is often the case that the cross-sectional shape of the rim protector is trapezoidal or triangular, being the same every here along the entire circumference of the sidewall.

Japanese Patent Application Publication Kokai No. 2002-59712 discloses that arrangement of a plurality of recesses with spaces therebetween in the tire circumferential direction at a rim protector reduces the thickness of the rim protector and suppresses generation of heat, and that the recesses also cause increase in surface area and improvement in heat dissipation characteristics.

With structures in which there is a rim protector that has recesses which extend continuously in the tire circumferential direction, because thinned regions will be present in continuous fashion in the tire circumferential direction due to the recesses, rigidity will be insufficient and the tire will be susceptible to flexing in the tire radial direction. Structures in which there is a rim protector that has a plurality of recesses which are arranged continuously without gaps therebetween in the tire circumferential direction will likewise have insufficient rigidity.

On the other hand, where a plurality of recesses are arranged with spaces therebetween in the tire circumferential direction as indicated at Patent Reference No. 1, because the spaces between the recesses will constitute projections, it will be possible to suppress decrease in rigidity. However, where a plurality of recesses are arranged with spaces therebetween at a rim protector, it will be the case that the thinned regions and thickened regions from which the recesses are formed will be arranged in alternating fashion along the tire circumferential direction. Strain tends to be concentrated at thinned regions; strain tends not to be concentrated at thickened regions where recesses are not provided. For this reason, regions at which strain tends to be concentrated are therefore arranged with spaces therebetween in the tire circumferential direction.

SUMMARY OF THE INVENTION

It is an object of the present disclosure to provide a pneumatic tire for which decrease in rigidity is suppressed while concentration of strain at recesses of a rim protector is at the same time also suppressed.

According of the present disclosure, there is provided a pneumatic tire having a tread and a bead, a sidewall arranged between the tread and the bead, and a rim protector which is formed at the sidewall and which constitutes an annular protrusion that extends in a tire circumferential direction;

wherein the rim protector has a first protruding edge which extends in the tire circumferential direction and which is toward an exterior in a tire radial direction, a second protruding edge which extends in the tire circumferential direction and which is toward an interior in the tire radial direction, a plurality of recesses arranged in the tire circumferential direction, and a plurality of ridges;

wherein the plurality of ridges respectively connect the first protruding edge and the second protruding edge, and are respectively formed between pairs of the plurality of recesses that are adjacent in the tire circumferential direction;

wherein each of the plurality of ridges comprises a first ridge that extends from the first protruding edge so as to be directed in a first direction in the tire circumferential direction to reach the second protruding edge, and a second ridge that extends from the second protruding edge so as to be directed in the first direction in the tire circumferential direction to reach the first protruding edge; and wherein the first ridges and the second ridges are arranged in alternating fashion along the tire circumferential direction.

In accordance with this constitution, because not less than two recesses are arranged with spaces therebetween in the tire circumferential direction at rim protector which constitutes an annular protrusion, projections will be formed between pairs of mutually adjacent recesses, and it will be possible to suppress decrease in rigidity more than would be the case with a structure in which pairs of mutually adjacent recesses are arranged without gaps therebetween in the tire circumferential direction. And yet, because mutually adjacent pair(s) of recesses are in positional relationship(s) such that the members of the pair partially overlap as seen when projected onto a virtual plane perpendicular to the tire radial direction, thickened region(s) will be present at said overlapping portion(s), permitting decrease in locations at which only a thinned region is present as viewed in the tire radial direction, and making it possible to decrease locations at which strain is concentrated and to cause strain to be distributed.

DETAILED DESCRIPTION OF THE PREFERRED EMBODIMENTS

First Embodiment

Below, a pneumatic tire in accordance with a first embodiment of the present disclosure will be described with reference to the drawings.

Figure 1:
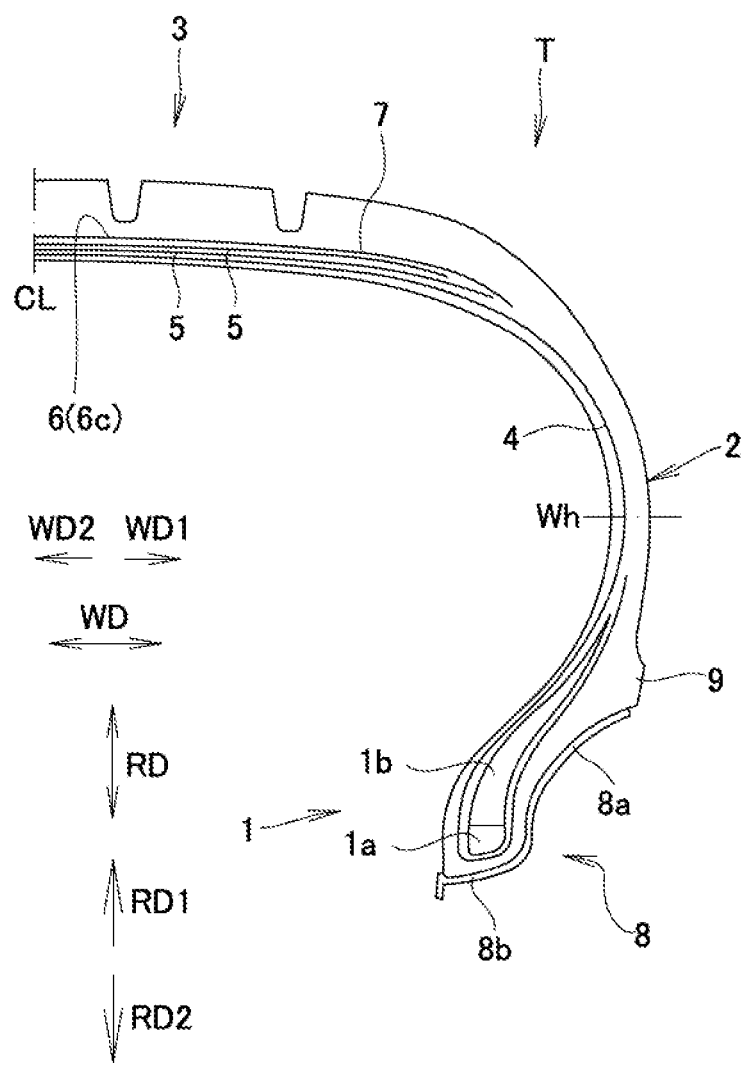
FIG. 1 Tire meridional half-section showing an example of a pneumatic tire associated with a first embodiment FIG. 2 Side view of tire showing rim protector in accordance with the first embodiment FIG. 3 Partial enlarged view of FIG. 2

As shown in FIG. 1, pneumatic tire T is provided with a pair of bead regions 1; sidewall regions 2 which extend toward the exterior RD1 in the tire radial direction from the respective bead regions 1; and tread region 3 which mutually connects the ends toward the exterior RD1 in the tire radial direction of the sidewall regions 2. Arranged at bead region 1 are annular bead core 1a at which steel wire or other such convergent body is coated with rubber, and bead filler 1b which comprises hard rubber. Bead region 1 is mounted on bead sheet 8b of rim 8, and provided that the air pressure is as it should be (e.g., air pressure as determined by JATMA)—is fitted in appropriate fashion to rim flange 8a by virtue of the tire internal pressure, such that the tire is made to engage with rim 8.

Furthermore, this tire is provided with toroidal carcass layer 4 which is arranged so as to span the distance between the pair of bead regions 1 and which extends from tread region 3 and passes through sidewall regions 2 to reach bead regions 1. Carcass layer 4 is made up of at least one carcass ply, and has end regions that are routed by way of bead cores 1a to be retained in upturned fashion. Arranged toward the inside circumferential surface of carcass layer 4 is inner liner rubber (not shown) for retention of air pressure.

Arranged at the outside circumferential surface of carcass layer 4 at tread region 3 is belt layer 5 which reinforces carcass layer 4 by virtue of the barrel hoop effect. Belt layer 5 has two belt plies that have cords which extend so as to be inclined by prescribed angle(s) with respect to the tire circumferential direction, the respective plies being laminated together in such fashion that the cords thereof intersect in mutually oppositely inclined fashion. Arranged toward the outside circumferential surface of belt layer 5 is belt reinforcing layer 7, and arranged at the outside circumferential surface further in that direction therefrom is the tread rubber at which the tread pattern is formed.

As examples of rubber raw material for the aforementioned rubber layers and so forth, natural rubber, styrene-butadiene rubber (SBR), butadiene rubber (BR), isoprene rubber (IR), butyl rubber (IIR), and so forth may be cited, it being possible for any one of these to be used alone, or for any two or more of these to be used in combination. Furthermore, such rubber(s) may be reinforced with carbon black, silica, and/or other such tiller, and vulcanizing agent, vulcanization accelerator, plasticizer, antioxidant, and/or the like may be blended thereinto as appropriate.

Figure 2:
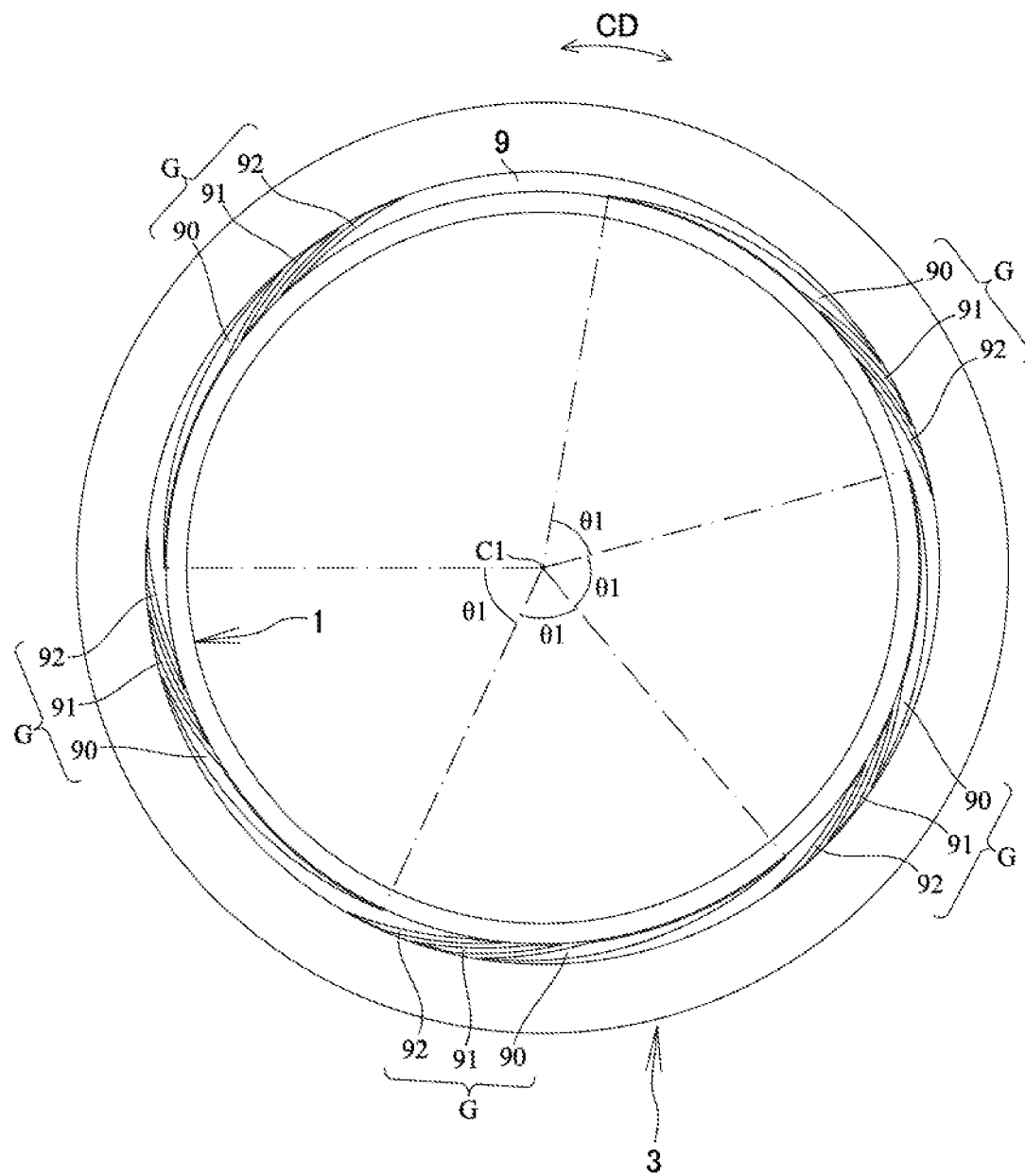
Figure 3:
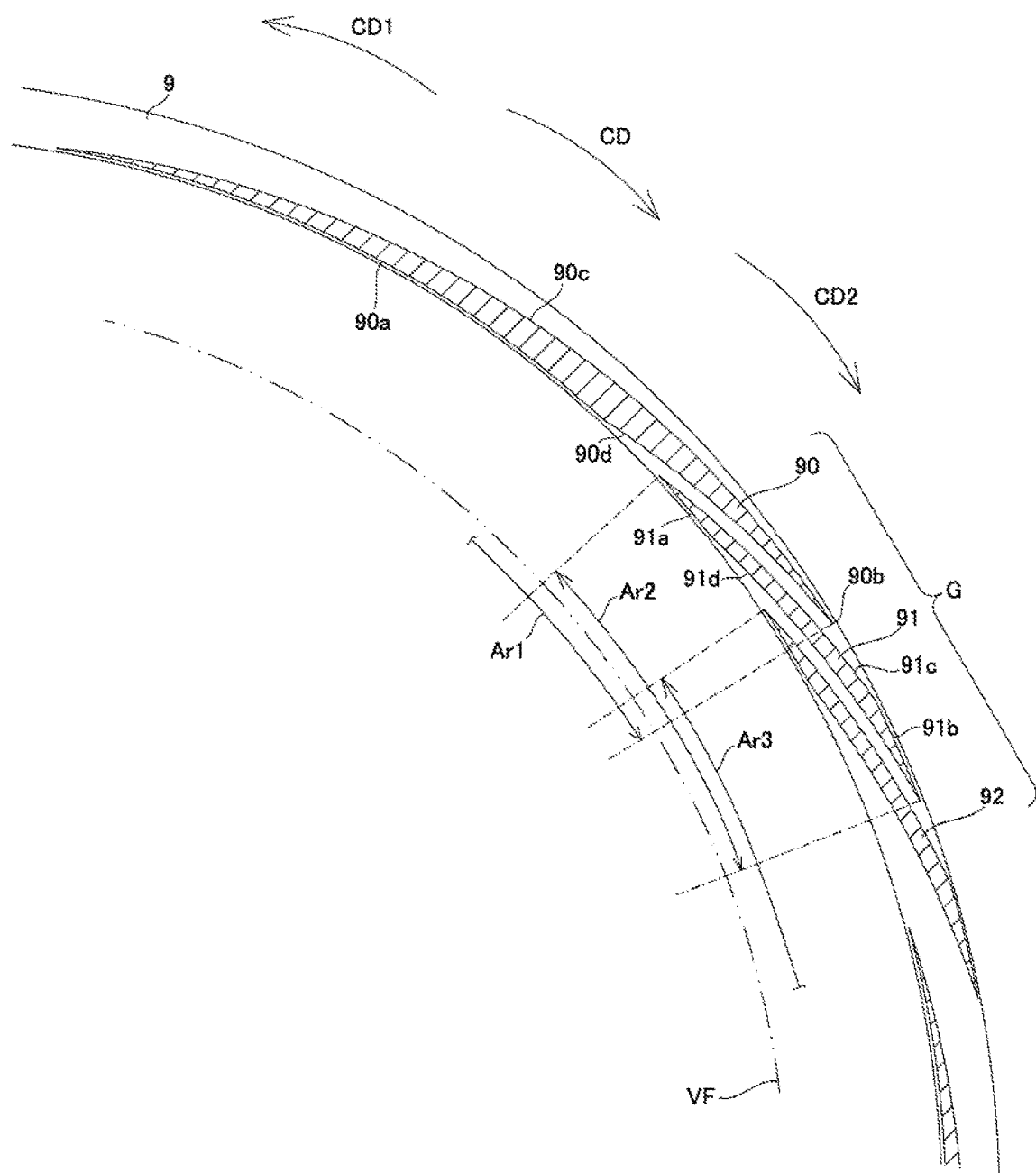

As shown in FIG. 1, in accordance with the present embodiment, rim protector 9 is formed at sidewall region 2. Rim protector 9 is arranged between the portion at which contact is made with rim flange 8a and the portion Wh at which tire width is a maximum. As shown in FIG. 1, FIG. 2, and FIG. 3, rim protector 9 constitutes an annular protrusion that extends in the tire circumferential direction CD. In a cross-sectional view of the rim protector 9 along a tire width direction or in a tire meridional section, the annular protrusion includes an outermost surface, a first sloping portion, and a second sloping portion. The outermost surface is located at an apex of the annular protrusion in the tire width direction between a first edge and a second edge. The first edge is adjacent to the second edge in a tire radial direction. The first sloping portion extends from the first edge toward the tread region. The second sloping portion extends from the second edge toward the bead region. While the cross-sectional shape of rim protector 9 is trapezoidal as viewed in the tire meridional section, there is no limitation with respect thereto, it being possible for example for the cross-sectional shape thereof to be triangular as viewed in the tire meridional section. As shown in FIG. 3, rim protector 9 has not less than two recesses 90, 91, 92 that are located within the outermost surface of the annular protrusion. The recesses extend toward the tread region from a location toward the bead region in such fashion as to be directed toward a location in the second direction CD2 from a location in the first direction CD1 in the tire circumferential direction CD. It is preferred that depths of the respective recesses 90, 91, 92 be the same, and that these be not less than 0.5 mm but not greater than 3.0 mm. The not less than two recesses 90, 91, 92 are arranged with spaces therebetween in the tire circumferential direction CD. At FIG. 3, recesses 90, 91, 92 are indicated by hatching. Whereas there are three recesses 90, 91, 92 in the example shown in FIG. 2 and FIG. 3, there is no limitation with respect thereto. It being sufficient that there be not less than two recesses, two, three, four, five, and six thereof may be cited examples. As shown in FIG. 3, a mutually adjacent pair of recesses (90, 91) (91, 92) among the plurality of recesses 90, 91, 92 are in a positional relationship such that they partially overlap as seen when projected onto a virtual plane VF perpendicular to the tire radial direction RD. At the example of FIG. 3, region Ar1 at which first recess 90 is projected onto virtual plane VF, and region Ar2 at which second recess 91 is projected onto virtual plane VF, overlap. Furthermore, region Ar2 at which second recess 91 is projected onto virtual plane VF, and region Ar3 at which third recess 92 is projected onto virtual plane VF, overlap. As shown in FIG. 3, the three recesses 90, 91, 92 constitute one group G. It is of course also possible to adopt a constitution in which one group G is constituted from two or more recesses.

As shown in FIG. 3, in terms of specific shape, first recess 90 is shaped after the fashion of a triangle having arcuate innermost edge 90a which is generally congruent to the edge toward the bead region of rim protector 9, outermost point 90b which is toward the tread region, and two curved sides 90c, 90d which connect innermost edge 90a and outermost point 90b. Second recess 91 is shaped after the fashion of a parallelogram having arcuate innermost edge 91a which is generally congruent to the edge toward the bead region of rim protector 9, arcuate outermost edge 91b which is generally congruent to the edge toward the tread region of rim protector 9, and two curved sides 91c, 91d which connect innermost edge 91a and outermost edge 91b. Third recess 92 is of the same shape as second recess 91. Note that second direction CD2 is the direction of rotation, the direction of rotation being indicated on the tire surface.

As shown in FIG. 2, not less than two (three in FIG. 2) recesses 90, 91, 92 constitute one group G. A plurality of groups G are arranged with uniform spaces therebetween in the tire circumferential direction CD. At FIG. 2, the spaces between the plurality of groups G are of length corresponding to the angle θ1 having vertex at tire axis C1. Of course, the plurality of groups G need not be arranged with uniform spaces therebetween. While five groups G are arranged therein in the example of FIG. 2, so long as there are not less than two thereof, the number of groups G that are present may be varied as appropriate.

Second Embodiment

Description will be carried out with respect to a tire in accordance with a second embodiment.

Figure 4:
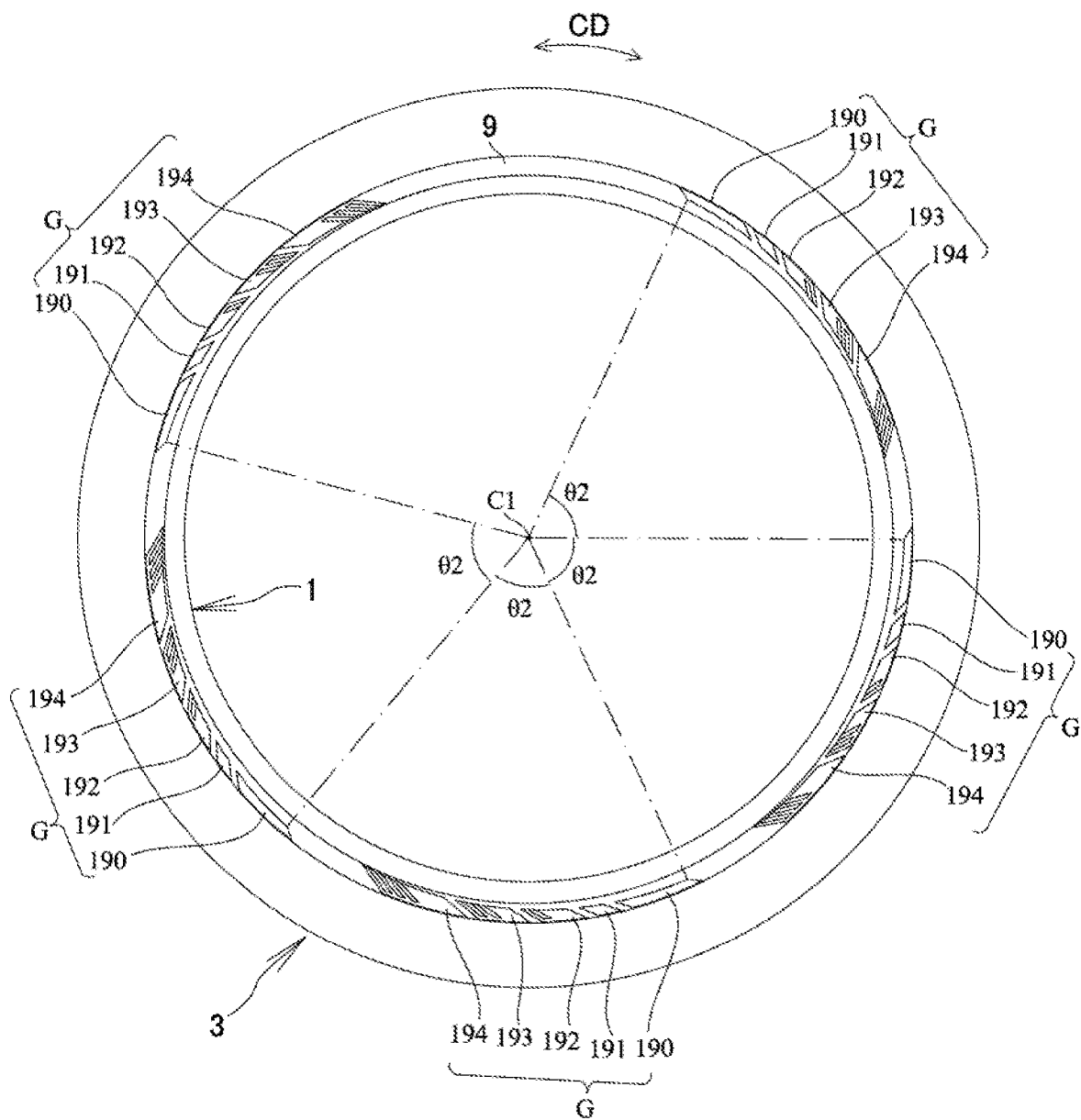
FIG. 4 Side view of tire showing rim protector in accordance with a second embodiment FIG. 5 Partial enlarged view of FIG. 4
Figure 5:
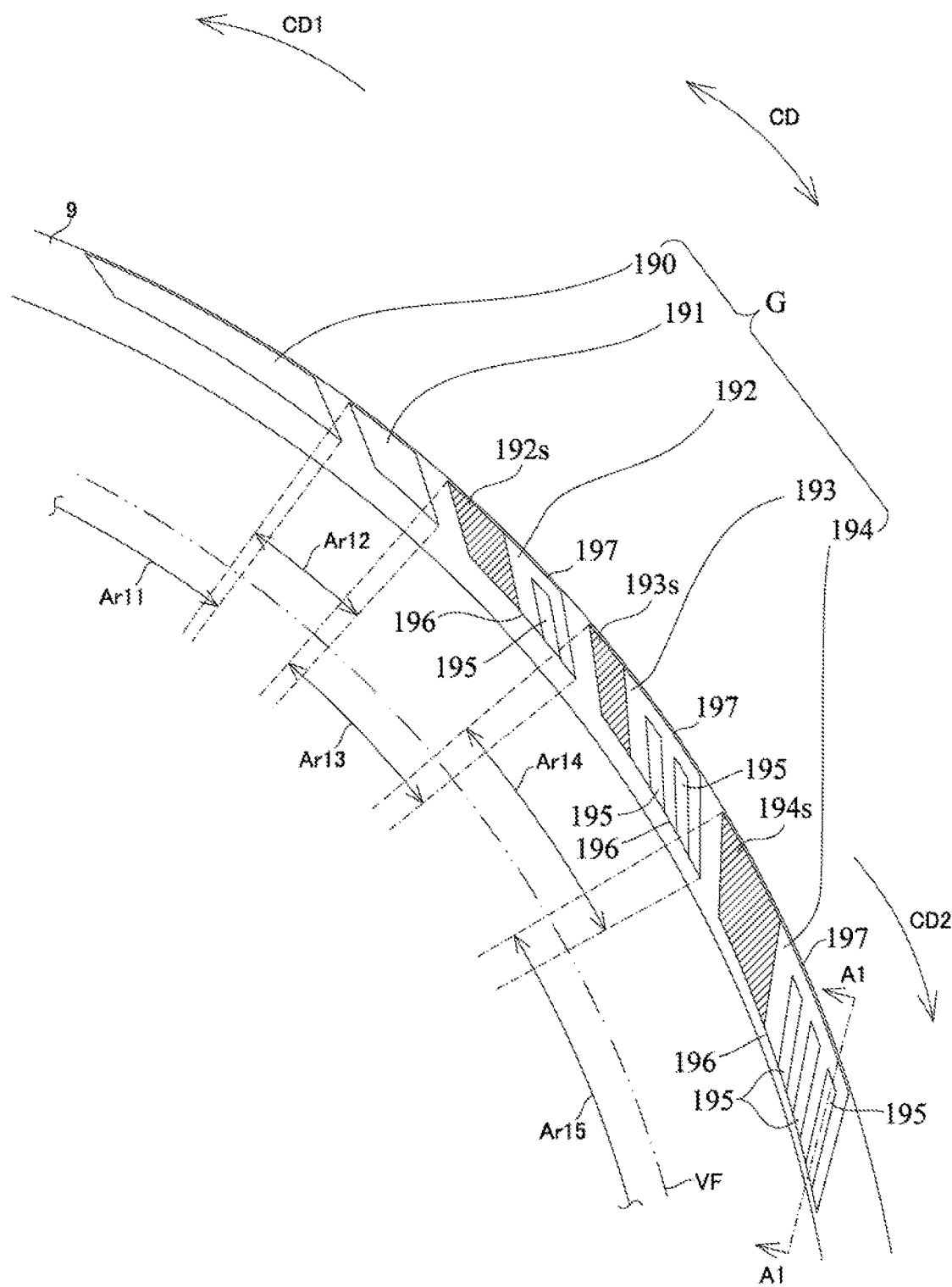

As shown in FIG. 4 and FIG. 5, rim protector 9 has not less than two recesses 190, 191, 192, 193, 194 that extend toward the tread region from a location toward the bead region in such fashion as to be directed toward a location in the second direction CD2 from a location in the first direction CD1 in the tire circumferential direction CD. These not less than two recesses 190, 191, 192, 193, 194 are arranged with spaces therebetween in the tire circumferential direction CD. Whereas there are five recesses 190, 191, 192, 193, 194 in the example shown in FIG. 4 and FIG. 5, there is no limitation with respect thereto. It is sufficient that there be not less than two recesses. It is preferred that maximum depth D1 of recesses 190, 191, 192, 193, 194 be not less than 0.5 mm and not greater than 3.0 mm. As shown in FIG. 5, a mutually adjacent pair of recesses (190, 191) (191, 192) (192, 193) (193, 194) among the plurality of recesses 190, 191, 192, 193, 194 are in a positional relationship such that they partially overlap as seen when projected onto a virtual plane VF perpendicular to the tire radial direction RD. At the example of FIG. 5, region Ar11 at which first recess 190 is projected onto virtual plane VF, and region Ar12 at which second recess 191 is projected onto virtual plane VF, overlap. Region Ar12 at which second recess 191 is projected onto virtual plane VF, and region Ar13 at which third recess 192 is projected onto virtual plane VF, overlap. Region Ar13 at which third recess 192 is projected onto virtual plane VF, and region Ar14 at which fourth recess 193 is projected onto virtual plane VF, overlap. Region Ar14 at which fourth, recess 193 is projected onto virtual plane VF, and region Ar15 at which fifth recess 194 is projected onto virtual plane VF, overlap. As shown in FIG. 5, the five recesses 190, 191, 192, 193, 194 constitute one group G. It is of course also possible to adopt a constitution in which one group G is constituted from two or more recesses.

As shown in FIG. 4, not less than two or not less than three (five in FIG. 4) recesses 190, 191, 192, 193, 194 constitute one group G. A plurality of groups G are arranged with uniform spaces therebetween in the tire circumferential direction CD. At FIG. 4, the spaces between the plurality of groups G are of length corresponding to the angle θ2 having vertex at tire axis C1. Of course, the plurality of groups G need not be arranged with uniform spaces therebetween. While five groups G are arranged therein in the example of FIG. 4, so long as there are not less than two thereof the number of groups G that are present may be varied as appropriate.

The plurality of recesses 190, 191, 192, 193, 194 shown in FIG. 4 and FIG. 5 are each shaped after the fashion of what appears to be a parallelogram as seen in a tire side view. Second direction CD2 is the direction of rotation, the direction of rotation being indicated on the tire surface. As shown in FIG. 5, third recess 192, fourth recess 193, and fifth recess 194 have serrations or first small protrusions 192s, 193s, 194s that protrude from the bases of the recesses as indicated by hatching. It is preferred that the amounts by which the serrations or first small protrusions 192s, 193s, 194s protrude therefrom be not greater than 20% of depth D1 of the recess.

Figure 6:
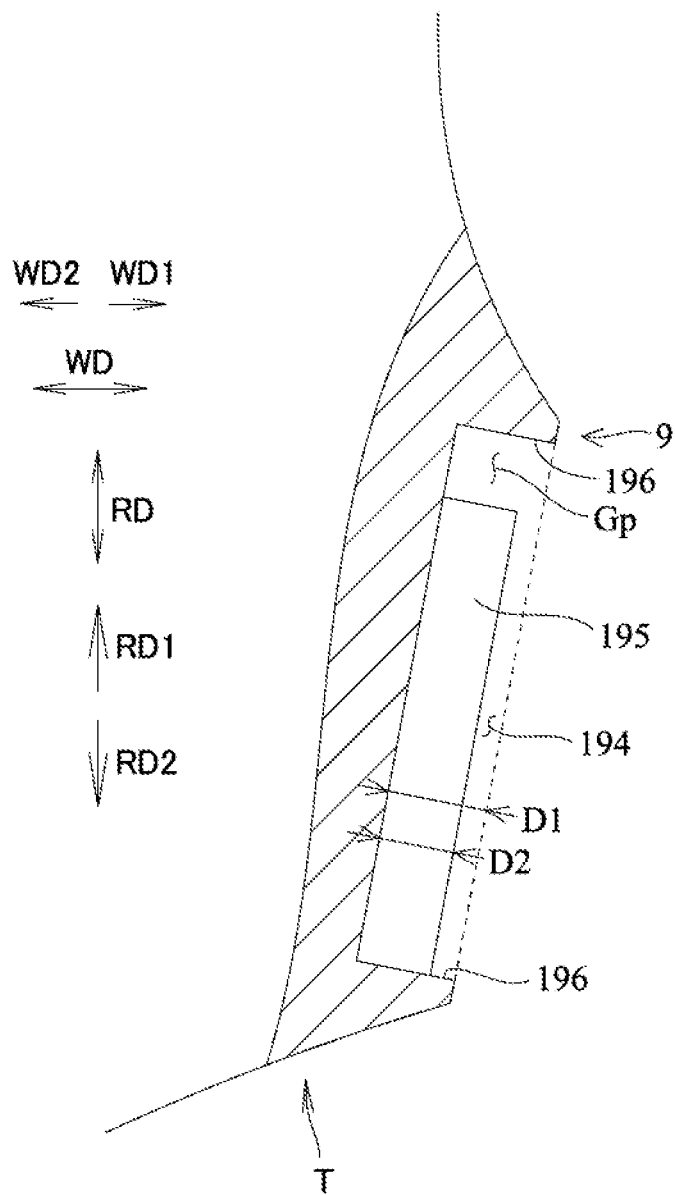
FIG. 6 Sectional view of section A1-A1 in FIG. 5

As shown in FIG. 5 and FIG. 6, third recess 192, fourth recess 193, and fifth recess 194 have second protrusions 195 that extend so as to be directed toward the tread region from edge 196 toward the bead region of recesses 192, 193, 194. There may be one or a plurality of second protrusions 195 present at each recess, it being possible for the number thereof to be varied as appropriate. The amounts D2 by which second protrusions 195 protrude are less than the depths D1 of the recesses 192, 193, 194. It is preferred that the amounts D2 by which these protrude be not less than 80% of depth D1. Second protrusions 195 are such that gaps Gp are formed between them and edge 197 toward the tread region of recesses 192, 193, 194. This makes it possible for air to pass through gaps Gp during rotation and for heat dissipation characteristics to be improved.

As described above, a pneumatic tire in accordance with the first or second embodiment having a tread region 3 and a bead region 1, a sidewall 2 arranged between the tread region 3 and the bead region 1, and a rim protector 9 which is formed at the sidewall 2 and which constitutes an annular protrusion that extends in a tire circumferential direction CD. The rim protector 9 has not less than two recesses (90, 91, 92, 190, 191, 192, 193, 194) located within the outermost surface at the apex of the annular protrusion. The not less than two recesses (90, 91, 92, 190, 191, 192, 193, 194) extend toward the tread region 3 from a location toward the bead region 1 in such fashion as to be directed toward a location in a second direction CD2 from a location in a first direction CD1 in the tire circumferential direction CD. The not less than two recesses (90, 91, 92, 190, 191, 192, 193, 194) being arranged with spaces therebetween in the tire circumferential direction CD. A mutually adjacent pair(s) of recesses (90, 91) (91, 92) (190, 191) (191, 192) (192, 193) (193, 194) among the not less than two recesses (90, 91, 92, 190, 191, 192, 193, 194) are in a positional relationship(s) such that they partially overlap as seen when projected onto a virtual plane perpendicular to a tire radial direction RD.

In accordance with this constitution, because not less than two recesses (90, 91, 92, 190, 191, 192, 193, 194) are arranged with spaces therebetween in the tire circumferential direction CD at rim protector 9 which constitutes an annular protrusion, projections will be formed between pairs of mutually adjacent recesses, and it will be possible to suppress decrease in rigidity more than would be the case with a structure in which pairs of mutually adjacent recesses are arranged without gaps therebetween in the tire circumferential direction. And yet, because mutually adjacent pair(s) of recesses (90, 91) (91, 92) (190, 191) (191, 192) (192, 193) (193, 194) are in positional relationship(s) such that the members of the pair partially overlap as seen when projected onto a virtual plane perpendicular to the tire radial direction RD, thickened region(s) will be present at said overlapping portion(s), permitting decrease in locations at which only a thinned region is present as viewed in the tire radial direction RD, and making it possible to decrease locations at which strain is concentrated and to cause strain to be distributed.

As is the case in the first or second embodiment, it is preferred that the not less than two recesses (90, 91, 92)[190, 191, 192, 193, 194] constitute one group (G) and a plurality of the groups (C) are arranged with uniform spaces therebetween in the tire circumferential direction CD.

This constitution will make it possible to cause strain to be distributed uniformly in the tire circumferential direction CD.

As is the case in the first second embodiment, it is preferred that not less than three of the recesses (90, 91, 92)[190, 191, 192, 193, 194] are one group, and mutually adjacent pain of the recesses (90, 91) (91, 92) (190, 191) (191, 192) (192, 193) (193, 194) within each of the groups are in positional relationships such that they partially mutually overlap as seen when projected onto virtual planes (VF) perpendicular to the tire radial direction RD.

This constitution will make it possible to decrease locations at which only a thinned region is present as viewed in the tire radial direction RD, and will make it possible to decrease locations at which strain is concentrated and to cause strain to be distributed As is the case in the second embodiment, it is preferred that at least one of the recesses (192, 193, 194) has serrations or first small protrusions 192s, 193s, 194s that protrude from the base of the at least one recess. This constitution will make it possible to improve visual attractiveness.

As is the case in the second embodiment, it is preferred that at least one of the recesses (192, 193, 194) has at least one second protrusion 195 that extends so as to be directed toward the tread region from an edge 196 toward the bead region of the at least one recess, an amount by which the at least one second protrusion 195 protrudes being less than a depth D1 of the at least one recess, and the at least one second protrusion 195 being such that a gap (Gp) is formed between it and an edge 197 toward the tread region of the at least one recess.

This constitution will make it possible to cause decrease in rigidity due to recesses (192, 193, 194) to be suppressed as a result of presence of second protrusions 195, and will also make it possible for air to be made to pass through gaps Gp during rotation and for heat dissipation characteristics to be improved.

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

The invention claimed is:

1. A pneumatic tire comprising:
   a tread region;
   a pair of bead regions;
   a pair of sidewalls each arranged between the tread region and the respective bead region; and
   a rim protector which is formed at at least one of the pair of sidewalls and which is constituted by an annular protrusion that extends in a tire circumferential direction,
   wherein in a cross-sectional view of the rim protector along a tire width direction, the annular protrusion includes an outermost surface, a first sloping portion, and a second sloping portion, the outermost surface being located at an apex of the annular protrusion in the tire width direction between a first edge and a second edge, the first edge being adjacent to the second edge in a tire radial direction, the first sloping portion extending from the first edge toward the tread region, the second sloping portion extending from the second edge toward the bead region,
   wherein at least two recesses are located within the outermost surface of the annular protrusion, the at least two recesses extending toward the tread region from a location toward the bead region in such fashion as to be directed toward a location in a second direction from a location in a first direction in the tire circumferential direction, the at least two recesses being arranged with spaces therebetween in the tire circumferential direction,
   wherein a mutually adjacent pair of recesses among the at least two recesses are in a positional relationship such that they partially overlap as seen when projected onto a virtual plane perpendicular to the tire radial direction, and
   wherein at least one of the recesses has serrations or first small protrusions that protrude from the base of the at least one recess.

2. The pneumatic tire according to claim 1 wherein two of the at least two recesses constitute one group, and a plurality of the groups are arranged with uniform spaces therebetween in the tire circumferential direction.

3. The pneumatic tire according to claim 1 wherein three of the at least two recesses are in one group, a plurality of the groups are arranged with uniform spaces therebetween in the tire circumferential direction, and mutually adjacent pairs of the recesses within each of the groups are in positional relationships such that they partially mutually overlap as seen when projected onto the virtual plane perpendicular to the tire radial direction.

4. The pneumatic tire according to claim 1 wherein the tire has a maximum width portion, and the first edge is located inside in the tire radial direction from the tire maximum width portion.

5. A pneumatic tire comprising:
   a tread region;
   a pair of bead regions;
   a pair of sidewalls each arranged between the tread region and the respective bead region; and
   a rim protector which is formed at least one of the pair of sidewalls and which is constituted by an annular protrusion that extends in a tire circumferential direction,
   wherein in a cross-sectional view of the rim protector along a tire width direction, the annular protrusion includes an outermost surface, a first sloping portion, and a second sloping portion, the outermost surface being located at an apex of the annular protrusion in the tire width direction between a first edge and a second edge, the first edge being adjacent to the second edge in a tire radial direction, the first sloping portion extending from the first edge toward the tread region, the second sloping portion extending from the second edge toward the bead region,
   wherein at least two recesses are located within the outermost surface of the annular protrusion, the at least two recesses extending toward the tread region from a location toward the bead region in such fashion as to be directed toward a location in a second direction from a location in a first direction in the tire circumferential direction, the at least two recesses being arranged with spaces therebetween in the tire circumferential direction,
   wherein a mutually adjacent pair of recesses among the at least two recesses are in a positional relationship such that they partially overlap as seen when projected onto a virtual plane perpendicular to the tire radial direction, and
   wherein at least one of the recesses has at least one second protrusion that extends so as to be directed toward the tread region from an edge toward the bead region of the at least one recess, an amount by which the at least one second protrusion protrudes being less than a depth of the at least one recess, and the at least one second protrusion being such that a gap is formed between it and an edge toward the tread region of the at least one recess.

* * * * *